C. G. HAWLEY.
APPARATUS FOR MILKING CATTLE.
APPLICATION FILED AUG. 7, 1912.
1,236,431. Patented Aug. 14, 1917.
3 SHEETS—SHEET 1.
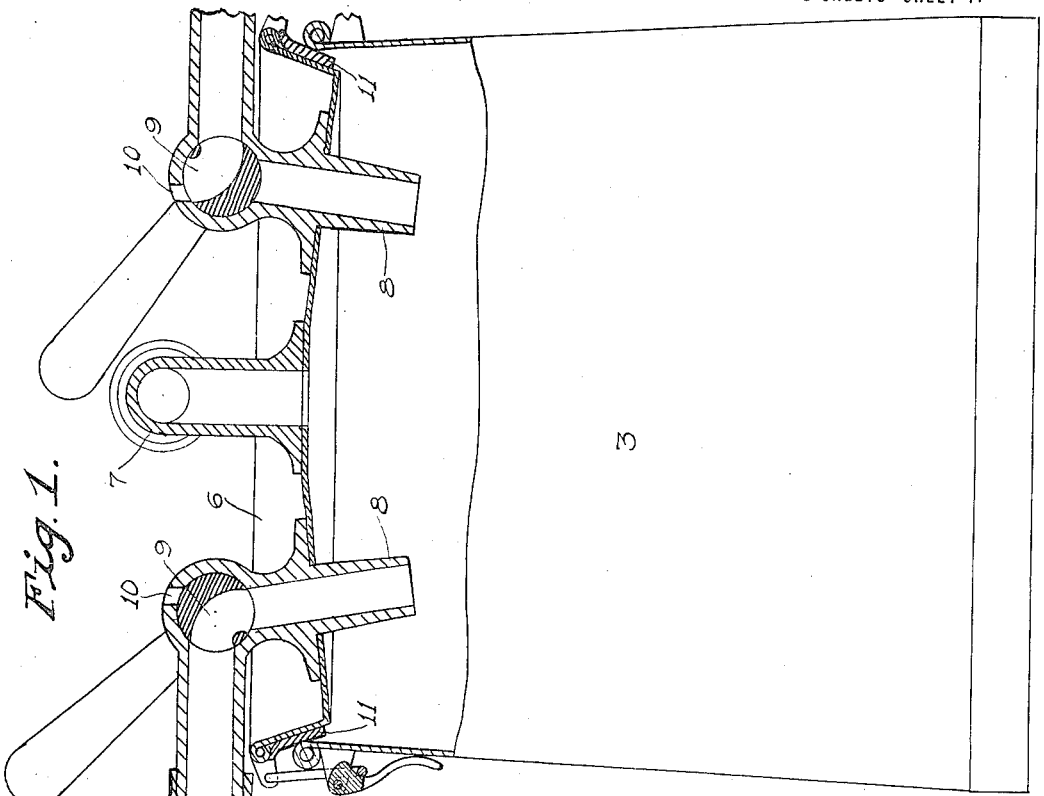
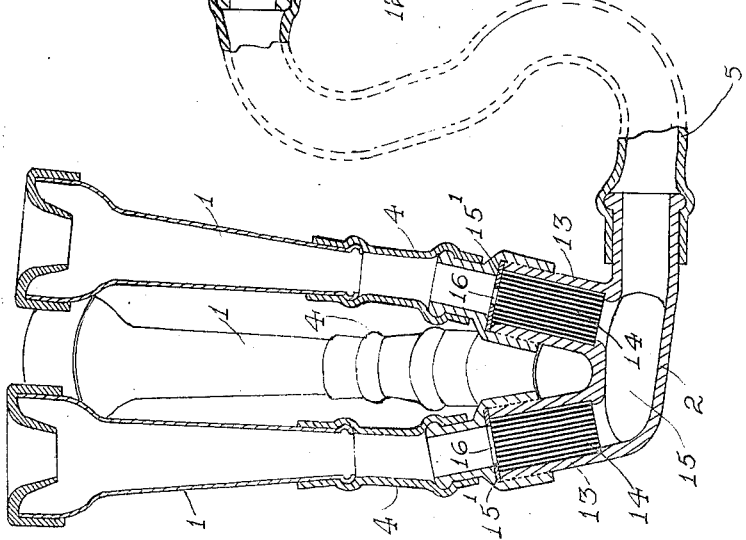
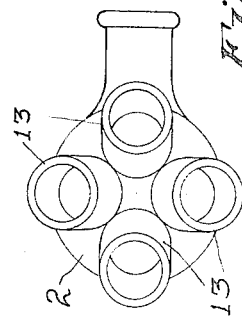
Witnesses: Inventor.

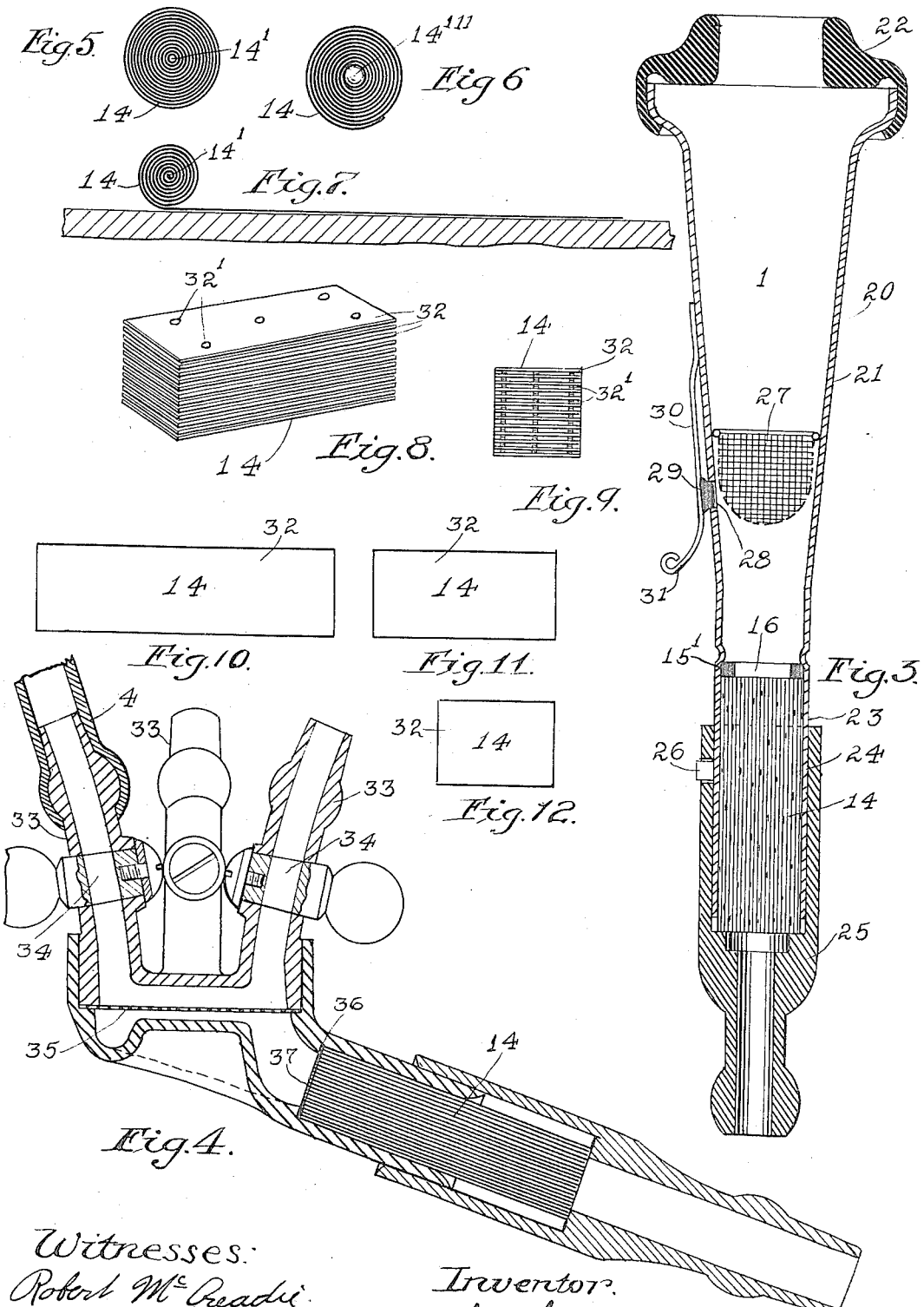

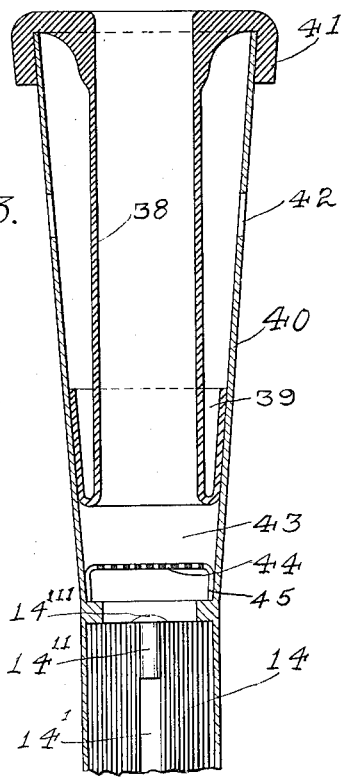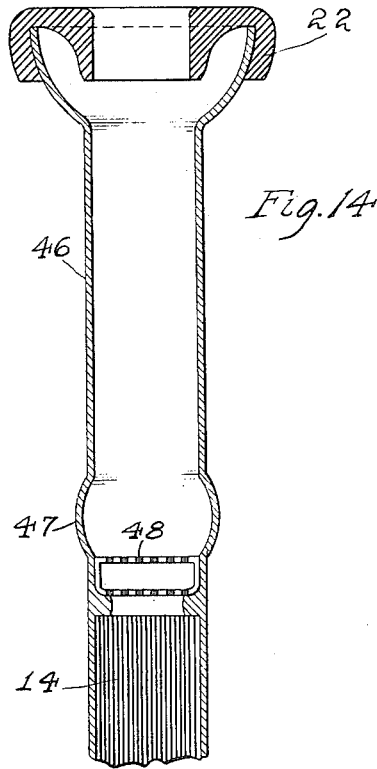

UNITED STATES PATENT OFFICE.

CHARLES GILBERT HAWLEY, OF CHICAGO, ILLINOIS.

APPARATUS FOR MILKING CATTLE.

1,236,431.  Specification of Letters Patent.  Patented Aug. 14, 1917.

Application filed August 7, 1912. Serial No. 713,811.

*To all whom it may concern:*

Be it known that I, CHARLES GILBERT HAWLEY, a citizen of the United States, and a resident of Chicago, Cook county, Illinois, have invented certain new and useful Improvements in Apparatus for Milking Cattle, of which the following is a full, true, clear, and exact description.

My invention relates to improvements in the art of milking cattle by mechanical means and has particular reference to pneumatic or vacuum milking systems.

The object of my invention is to provide a mechanical means with which to milk cows, which will, in a practical sense, simulate the action of the calf in sucking and thus cause the animal to "give down" or, in other words, permit its milk to flow freely and rapidly in a natural manner.

A further object is to provide means in combination with a substantially constant vacuum, which will automatically produce a pulsating action upon the teat and thereby gently excite the glands of the udder and teat to a sufficient degree to cause the milk to flow freely.

My invention resides in a means of milking cattle which consists in applying the action of a substantially constant vacuum to the teat and for automatically and periodically reducing or stopping the action of the vacuum upon the teat according to the quantity of milk flowing therefrom.

Further my invention consists in the combination with a substantially constant vacuum and communication between the vacuum and a teat cup, of means interposed between the vacuum and the teat cup for automatically reducing the vacuum action upon the teat according to the quantity of milk flowing therefrom.

A fundamental feature of my invention resides in the application of the familiar law in physics known as the law of surface or capillary attraction, and which may be stated as the attraction of the surface of a body, for a liquid. I adapt this law to the production of a pneumatic or vacuum milking system by placing a laminated plug or stopper in the tube which connects the vacuum vessel with the teat cup, and which is so formed that it presents a plurality of minute or small passages which allow air to pass freely but which act to retard the passage of a liquid, due to the surface attraction of the walls of the passage for the liquid. In other words these laminated plugs, stoppers or dams permit the milk to be slowly drawn through them by the action of the vacuum, during which time the passing milk shuts off the vacuum from the teat and when the plug is free of milk the air is drawn rapidly through the plug and the vacuum again draws upon and expands the teat. I thus not only produce an intermittent or pulsating action of the vacuum upon the teat but this action is regulated by and corresponds with the quantity of milk flowing from the teat. That is to say if the milk flows continuously from the teat there is substantially no action of the vacuum thereon as it is shut off by the flowing milk which fills the passages in the plug, but if the milk flows only in small quantities or drops, the vacuum is shut off from the teat only during the interval that is consumed in the passage of this small quantity of milk through the plug, when the vacuum is again applied to the teat. This action results in gentle and widely separated pulls by the vacuum in the beginning or when the milk flows freely and sharper and more frequent action during the stripping process or when the milk flows in small quantities or drops.

My invention further consists in the combination with a substantially constant vacuum and means associated therewith for periodically applying the action of the vacuum to the teat, of a teat cup formed to cause the surface of the teat to contact with the inner wall of the cup when the vacuum is applied to the teat.

A further feature of my invention resides in a teat cup formed with walls sufficiently flexible so that when the vacuum is applied to the cup the walls will be drawn in slightly to produce a gentle pressure upon the body of the teat while leaving its lower end free to be expanded by the action of the vacuum.

My invention also consists in various features of construction and combinations of parts, all as hereinafter described and particularly pointed out in the claims.

My invention will be more readily understood by reference to the accompanying drawings forming a part of this specification and in which:

Figure 1 is a sectional diagrammatic view of an apparatus which I have found to be best adapted for carrying out my improved method;

Fig. 2 is a top plan view of a base connection for four teat cups;

Fig. 3 is a full sized longitudinal section of a teat cup embodying my invention;

Fig. 4 is a longitudinal section of a vacuum connection illustrating a form in which one vacuum regulating plug is connected to four teat cups;

Fig. 5 is an end view of a laminated plug formed from a flat sheet of flexible metal rolled up into cylindrical form;

Fig. 6 is a view similar to Fig. 5 but showing the center hole of the plug filled by means of a solid stopper;

Fig. 7 is a view similar to Fig. 5 but showing the plug partly unrolled and in condition to be wiped off or cleansed;

Fig. 8 is a view in perspective of a form of laminated plug made up of a pile of rectangular plates of thin metal;

Fig. 9 is an end view of the plug illustrated in Fig. 8 clearly showing the contracted passages therethrough;

Figs. 10, 11 and 12 are similar plan views of plates used in the production of the laminated plugs illustrated in Fig. 8, and illustrating the method of producing plugs of varying lengths;

Fig. 13 illustrates a teat cup arranged to gently irritate or excite the surface of the teat; and Fig. 14 illustrates a further modified form of teat cup.

The cow milking apparatus as illustrated in Fig. 1 consists in a plurality of teat cups or chambers 1 mounted upon and connected to a hollow base member 2 which is connected to and communicates with a vacuum vessel 3 maintained under a substantially constant vacuum. A sufficient number of the teat cups 1 are provided so that one of the cups may be provided for each teat, of the animal which is to be milked, and are connected by flexible connections 4 with the base member 2, so that they will be free to assume their proper positions relatively to each other. The base member 2 is connected to the vacuum vessel 3 by means of a flexible connection or hose 5 and the relation between the base member 2 and the vessel 3 should be such that the milk can flow freely from the base 2 into the vessel 3 by gravity, although in Fig. 1, which is a diagrammatic view the base 2 is illustrated as below the top of the vessel 3. The vacuum vessel 3 serves as a collecting chamber for the milk and is provided with a cover member 6 hermetically sealed thereto and to which is attached a connection 7 communicating with suitable means, such as a vacuum pump, for producing a substantially constant vacuum. The cover member is provided with a plurality of connections 8 hermetically sealed thereto and to which the hose leading from different sets of teat cups may be connected. Each of these hose connections is provided with a three way valve 9 which as illustrated in Fig. 1 may be turned to connect its hose with the vacuum vessel or may be arranged to connect its hose through a vent 10 with the atmosphere, whereby the vacuum remaining in the hose, is destroyed and the teat cups may be readily removed from the teats. The cover member 6 is tapered or upwardly flared at its outer rim and is adapted to be wedged tightly within the upper end of the vacuum vessel. A soft packing ring 11 is provided to insure an air tight joint between the cover and the vessel. To further secure the cover to the vessel locking devices 12 of usual form are provided which interlock the cover with the vessel and draw it firmly down into place therein.

The base 2 is provided with an upwardly projecting nozzle 13 for each of the teat cups and within the nozzle is mounted a laminated plug or stopper 14 which is adapted to completely fill the nozzle or connection and provide therein a plurality of thin or capillary-like passages connecting the teat cup with the chamber 15 in the base 2. As noted heretofore these laminated plugs or stoppers allow the air to be drawn freely therethrough while serving to retard the passage of the milk. In other words they offer practically no resistance to the passage of the air from the teat chamber to the vacuum vessel, but when the milk flows from the teat and reaches the laminated plug, the liquid, in being drawn through the capillary-like passages in the plug, shuts off the action of the vacuum from the teat chamber, and the passages in the plug retard the passage of the liquid therethrough and therefore act to relieve the teat from the action of the vacuum during the period of said passage. The action of the vacuum on the teat is therefore what might be termed in a sense, pulsating and furthermore this pulsating action is automatically controlled by the quantity of milk flowing from the teat. In other words should the milk flow substantially constantly from the teat, the milk would be drawn through the plug 14 into the vacuum chamber and the vacuum would practically not act upon the teat directly at all. When, however, the milk stops flowing and is drawn through the plug, freeing the plug from liquid, the vacuum draws the air from the teat chamber and acts quickly and directly upon the teat. It is thus seen that where for any reason the milk flows slowly or in drops from the teat, the periodic actions of the vacuum thereon are closely related and are more or less sudden and vigorous, which is a desirable condition as this occurs during what is termed the stripping process or after the bulk of the milk has been withdrawn from the animal.

As different animals, and also sometimes the various teats of a single animal, require varied or different effects of the vacuum thereon to produce the best results, I have provided means for varying the action of the vacuum upon the different teat chambers, by providing a removable washer or collar 15' arranged at the upper end of the plug 14 having a central opening 16, which hole may be of different sizes in different washers, a small hole being used where a gentle action of the vacuum is desired and a larger one where a more vigorous action is necessary.

In dairy practice it is very desirable that all of the apparatus used in connection with milk should be so arranged that it can be easily and thoroughly cleansed. I therefore arrange the various parts of my novel milking apparatus so that they may be easily separated and assembled for cleansing purposes. In Fig. 3 I have illustrated one of the individual teat cups in slightly modified form having a tapered shell 20, forming a teat chamber 21 in its upper end and provided with a soft rubber teat connection or ring 22 upon its upper end. The lower end 23 of the shell provides a cylindrical chamber 24 for the laminated plug 14. A hose connection 25 is provided telescopically fitting upon the casing 20 and connected thereto by means of a bayonet joint connection 26 by means of which the teat cup may be readily moved from the hose connection. A cup-like screen 27 is provided which is loosely mounted in the lower end of the chamber 21 and serves to prevent dirt or hair from passing to the laminated plug 14. It is sometimes desirable to remove the teat cup from the teat without operating the valve on the cover of the vacuum vessel and I therefore provide a vent opening 28 in the wall of the teat cup which is normally closed by the spring actuated plug 29. This plug 29 is mounted upon a spring 30 having a thumb latch 31 by means of which the plug may be raised to open the vent 28 and thereby destroy the vacuum within the teat chamber so that the cup may be readily removed from the teat.

Figs. 5 to 12 inclusive illustrate various forms of laminated plugs or stoppers. These plugs are formed as has been stated to provide a plurality of thin or capillary-like passages through which the vacuum can draw the milk and I prefer to form the plugs so that the various plates or layers of which they are composed may be readily separated in order that they may be easily cleaned, but it will be understood that they could be made in such form that they could not be separated easily, in which case they could be cleansed by means of a steam jet or some other convenient method.

As illustrated in Fig. 5, I sometimes form the plugs 14 from a plurality of telescopically interfitting tubes beginning at the center with a tube of very small diameter and gradually increasing in diameter until the necessary or desired diameter of plug is reached. These various tubes are held in relative position by the frictional contact between them which can be increased by slightly deforming the tubes before they are placed in position or by any other convenient means.

The plug illustrated in Fig. 6 is made by winding or rolling a sheet of flexible non-spring metal which is rolled up into cylindrical form, the concentric layers of the material being separated by thin spaces. These spaces may be produced by the inequalities of the metal plate itself, that is, the metal plate not being exactly flat it will contact in various places and between the contacting portions will be held out of contact thereby forming thin capillary-like passages through the plug.

In forming a laminated plug by rolling up a strip of soft metal upon itself into cylindrical form a small open passage 14' is left extending longitudinally through the center of the plug and as this passage would allow the milk to be drawn through the plug too quickly I stop it off or fill it by means of a pin or rivet 14″ having a head 14‴. The head 14‴ rests upon the upper end of the plug 14 and retains the pin 14″ in position. In Fig. 7 I have illustrated the plug as being partly unrolled and laid upon a table in condition to be washed or cleansed. In making use of plugs of this kind, they can be unrolled and cleaned and then rerolled into cylindrical form, frequently, without destroying the utility of the metal. The metal of which these plugs are made is preferably non-corrosive, i. e. not deleteriously affected by the lacteal fluids. The plug illustrated in Fig. 8 is formed of a series or pile of rectangular plates 32 which are held out of contact with each other by means of small pressed projections 32' formed in the body of the plate. The plates 32 are separably associated together to the end that they may be readily cleaned. It will be understood that the socket in which the plugs are placed takes its shape from the shape of the plug which is mounted therein, that is, a socket in which a cylindrical plug is used would be cylindrical, and one in which a plug, such as illustrated in Fig. 8 is used would be rectangular in cross section.

In arranging my system to meet the necessary requirements, I have found it desirable to provide a further means of regulating the action of the vacuum upon the teat, that is, in some instances it is desirable to reduce the time intervening between the successive actions of the vacuum upon the teat. This I accomplish by making plugs of various lengths so that the time required for the milk to be drawn through the plug may be varied. In Figs. 10, 11 and 12, I have illustrated side elevations of these laminated plugs of various lengths and it will readily be understood that a longer plug could be removed from its socket and a shorter plug put in its place when desirable.

In some instances I have found that the action of the vacuum upon a number of the teats can be regulated by means of one of the laminated plugs instead of being regulated individually as heretofore explained and, in Fig. 4 of the drawings, I have illustrated an apparatus in which one of the laminated plugs 14 is inserted in the connection between the teat cup base and the vacuum vessel, the base being provided with four teat cup connections 33 each one of which is provided with a valve 34 by means of which it can be closed when its teat cup is not in use. This apparatus is also provided with a screen 35 which prevents dirt from passing through to the laminated lug. Also a collar 36 is provided at the cup end of the laminated plug having a central opening 37 thereby providing means for modifying the action of the vacuum upon the teat cups.

Besides providing the action of the vacuum upon the teat which has been described, it is desirable in some instances that the glands of the teat be gently excited by means of pressure upon the walls of the teat to cause an easy and free flow of the milk. To accomplish this I provide a teat cup as illustrated in Fig. 13 having a flexible inner cylindrical wall 38 forming the teat chamber. This flexible wall 38 extends downwardly from the mouth of the cup substantially the length of the teat to which the cup is to be applied and is turned out and back upon itself at its lower end forming a cup portion 39, the outer surface of which is in contact with the inner wall of the casing 40 of the cup. The wall 38 is formed integrally with the cap 41 of the cup and is removable from the cup therewith. When the vacuum is acting upon the teat cup, the cup like portion 39 of the inner wall is held in close contact with the inner surface of the teat cup shell by the pressure of the atmosphere and effectually seals this joint against the entrance of air. The shell 40 of the cup is provided with openings 42 thereby connecting the space outside of the wall 38 with the atmosphere. When this cup is placed upon the teat and the vacuum acts upon the cup, the pressure of the atmosphere surrounding the flexible wall 38 compresses it upon the teat and when the milk flows and shuts off the action of vacuum by filling the pores or passages in the laminated plug 14, the vacuum is destroyed by the leakage of air, around the teat, into the cup and the flexible wall 38 is thereby forced, or allowed to go, back to its original position, thereby relieving the teat of pressure. It will be noted that the pressure is produced upon the teat simultaneously with the drawing or sucking action of the vacuum and the combination of the two actions results in substantially an exact simulation of the sucking of the calf. In the cup illustrated in Fig. 13 a chamber 43 is provided adjacent to the lower end of the inner cylinder in the position which would naturally be occupied by the lower end of the teat so that it will not be affected by the pressure of the wall 38. A screen 44 is also provided in this cup for a purpose similar to the strainer 27 illustrated in Fig. 3. This strainer 44, however, is of very simple construction being flat and formed with an annular rim 45 for supporting it above the bottom of the teat chamber to form a space between the screen and the upper end of the plug 14. In Fig. 14 I have illustrated a somewhat simpler design of teat cup arranged to produce a slight pressure upon the outer wall of the teat by the action of the vacuum. In this form of teat cup the outer wall instead of being conically formed, as in the former instances, is substantially cylindrical and substantially the length of the teat to which the cup is to be applied.

In using this cup the action of the vacuum in drawing upon the teat tends to expand or enlarge the body of the teat and thereby bring it into contact with the cylindrical wall 46. This action produces the slight pressure desired. The lower end 47 of the cup is made larger than the cylindrical portion so that the end of the teat, which occupies this space, will not be affected by this slight irritating or exciting pressure but will be left free to be expanded by the action of the vacuum and thereby freely exude or emit the milk. In this form of teat cup I have provided a double strainer 48 for the purpose of preventing dirt or hair from passing through the cup to the laminated plug 14.

I have herein described the specific structures which I consider best adapted for carrying out my improved method of milking cattle, but it will be understood that my invention is not confined or limited to these structures, many modifications of which will readily suggest themselves to any person skilled in the art and all of which would lie within the spirit or scope of my invention.

Having thus described my invention, I claim as new and desire to secure by Letters Patent:

1. A cow milker comprising a vessel maintained under a substantially constant vacuum, in combination with a suction teat cup in communication therewith, and capillary passages interposed between the vessel and the cup for coaction with the milk flow and whereby the action of the vacuum will be shut off periodically by capillary action according to the quantity of milk flowing from the teat to which the cup is attached.

2. A valveless cow milker comprising the combination with a suction teat cup and a vessel maintained under an intended constant vacuum communicating therewith, of capillary means interposed between the cup and the vessel whereby the suction action of the vacuum is shut off from the teat to which the cup is attached, by means of the milk flowing therefrom.

3. A cow milker comprising the combination with a suction teat cup and a vessel maintained under a substantially constant vacuum communicating therewith, of an obstruction provided with capillary passages interposed between the cup and the vessel, operating to deter the flow of milk therethrough and during the passage of the milk shutting off the free action of the vacuum from the cup, and said obstruction offering substantially no obstruction to the passage of air when free of milk.

4. A vacuum cow-milker, comprising the combination with a suction teat cup and a vessel maintained under a substantially constant vacuum communicating therewith, of a plug or stopper interposed between the cup and vessel, which presents a plurality of substantially capillary passages for the passage of the milk and air from the cup to the vessel.

5. A vacuum cow-milker, comprising the combination with a suction teat cup and a vessel maintained under a substantially constant vacuum communicating therewith, of a laminated plug or stopper interposed between the cup and vessel presenting a plurality of thin passages for the passage of the milk and air from the cup to the vessel.

6. A vacuum cow-milker, comprising the combination with a suction teat cup and a vessel maintained under substantially constant vacuum communicating therewith, of a plug interposed between the cup and vessel presenting a plurality of thin capillary-like passages, and means associated therewith for varying the total effective area of said passages.

7. A vacuum cow-milker, comprising the combination with a suction teat cup and a vessel maintained under a substantially constant vacuum communicating therewith, of a laminated plug interposed between the cup and vessel presenting a plurality of thin capillary-like passages, the laminations of said plug being easily separated for cleaning.

8. A vacuum teat cup comprising, in combination, a teat chamber and means for connecting the cup to a vacuum vessel, the lower end of said cup being closed by a laminated plug presenting a plurality of thin passages, and means for breaking the vacuum in the teat chamber to permit the easy removal of the cup from the teat.

9. A vacuum teat cup comprising, in combination, a teat chamber and means for connecting the chamber with a vacuum vessel, a laminated plug in the lower end of the cup presenting a plurality of capillary-like passages for the passage of the milk, and a screen interposed between the teat chamber and the plug.

10. A vacuum teat cup comprising, in combination, a vacuum teat chamber having flexible walls adapted to be compressed upon the body of the teat by the action of the vacuum, means for connecting the lower end of the cup to a vacuum vessel, and a laminated plug in the lower end of the cup presenting a plurality of thin capillary-like passages.

11. A vacuum teat cup having a cylindrical teat chamber in its upper end substantially the diameter of the teat to which the cup is to be applied, and a connection to a vacuum vessel at its lower end, said chamber being enlarged at its lower end for the reception of the end of the teat, in combination with a laminated plug interposed between the chamber and the vacuum vessel and presenting a plurality of capillary passages for the passage of the milk.

12. The herein described improvement in cow milkers, comprising a teat cup, in combination with a vacuum connection for said cup, and a capillary pulsating plug in said connection, substantially as and for the purpose described.

13. The herein described improvement in cow milkers, comprising a teat cup, in combination with a vacuum connection for said cup, a capillary pulsating plug in said connection, and means for regulating the capillary capacity of said plug, substantially as and for the purpose described.

In testimony whereof, I have hereunto set my hand, this 3rd day of August, 1912, in the presence of two subscribing witnesses.

CHARLES GILBERT HAWLEY.

Witnesses:
EDWARD F. WILSON,
JOHN R. LEFEVRE.